(12) United States Patent
Oka et al.

(10) Patent No.: US 10,137,630 B2
(45) Date of Patent: Nov. 27, 2018

(54) CONTROL METHOD OF EMBOSSING APPARATUS

(71) Applicant: Graphtec Corporation, Kanagawa (JP)

(72) Inventors: Ryoichi Oka, Kanagawa (JP); Kazuhiro Watanabe, Kanagawa (JP); Tsutomu Ohira, Kanagawa (JP)

(73) Assignee: Graphtec Corporation, Kanagawa (JP)

( * ) Notice: Subject to any disclaimer, the term of this patent is extended or adjusted under 35 U.S.C. 154(b) by 355 days.

(21) Appl. No.: 15/048,273

(22) Filed: Feb. 19, 2016

(65) Prior Publication Data

US 2016/0243752 A1 Aug. 25, 2016

(30) Foreign Application Priority Data

Feb. 23, 2015 (JP) .................. 2015-032570

(51) Int. Cl.
| | |
|---|---|
| *B29C 59/02* | (2006.01) |
| *B26D 3/08* | (2006.01) |
| *B26D 5/00* | (2006.01) |
| *B26F 1/38* | (2006.01) |
| *B31F 1/07* | (2006.01) |
| *B32B 38/06* | (2006.01) |
| *B44B 5/00* | (2006.01) |

(52) U.S. Cl.
CPC .............. *B29C 59/02* (2013.01); *B26D 3/085* (2013.01); *B26D 5/005* (2013.01); *B26F 1/3813* (2013.01); *B31F 1/07* (2013.01); *B31F 2201/0794* (2013.01); *B31F 2201/0797* (2013.01); *B32B 38/06* (2013.01); *B44B 5/0095* (2013.01)

(58) Field of Classification Search
CPC ....... B26D 3/085; B26D 5/005; B26F 1/3813; B31F 1/07; B44B 5/0095; B32B 38/06
USPC ......................................... 264/40.1
See application file for complete search history.

(56) References Cited

U.S. PATENT DOCUMENTS

| | | | |
|---|---|---|---|
| 6,506,324 | B1 | 1/2003 | Gerber |
| 2002/0058125 | A1* | 5/2002 | Gerber .................. B29C 59/026 428/137 |
| 2005/0186010 | A1* | 8/2005 | Shibata .................. B26D 7/015 400/621 |
| 2007/0029383 | A1* | 2/2007 | Francis .............. H04N 1/00127 235/432 |
| 2007/0227332 | A1 | 10/2007 | Causse et al. |
| 2016/0026168 | A1 | 1/2016 | Crystal et al. |

OTHER PUBLICATIONS

Extended European Search Report, Application No. 16156426, dated Jul. 15, 2016, 7 pages.

* cited by examiner

*Primary Examiner* — Seyed Masoud Malekzadeh
*Assistant Examiner* — Lawrence D. Hohenbrink, Jr.
(74) *Attorney, Agent, or Firm* — Meyertons, Hood, Kivlin, Kowert & Goetzel, P.C.; Mark R. DeLuca

(57) ABSTRACT

A blade of a cutting tool is stuck into a medium adhered on a support member and is stopped in a state in which a blade edge is positioned between upper and lower surfaces of the medium. A cut line is formed in the medium by the support member and the cutting tool being moved. The blade is pulled out from the medium. An embossing tool is pressed against a position along the cut line of the medium. A continuous recess extending along the cut line is formed in the medium by the support member and the embossing tool being moved.

3 Claims, 12 Drawing Sheets

CONTROL METHOD OF EMBOSSING APPARATUS

BACKGROUND OF THE INVENTION

The present invention relates to a control method of an embossing apparatus for performing embossing by pressing a processing tool against a sheet-like medium to be processed.

An embossing apparatus for performing embossing on a sheet-like medium to be processed is disclosed in, e.g., Japanese Patent Laid-Open No. 2001-277353 (literature). This embossing apparatus disclosed in the literature includes a platen roller having a function of feeding a belt-like medium to be processed, and an embossing tool to be pressed against the medium to be processed on this platen roller. The belt-like medium to be processed is used as it is pulled out from a supply reel arranged adjacent to the platen roller.

The platen roller is formed into a cylindrical shape having a size by which the medium to be processed can be wound, and rotates when driven by a driving device. The outer circumferential surface of this platen roller is elastic. Also, sprockets are formed in the two end portions of the platen roller in the axial direction. These sprockets engage with large numbers of feed holes formed on the two side portions of the medium to be processed, and feed the medium to be processed in the longitudinal direction as the platen roller rotates.

The embossing tool has a rotatable ball to be pressed against the medium to be processed. This embossing tool is supported by a tool head, and arranged in a position above the platen roller and opposite to the platen roller with the medium to be processed being sandwiched between them. The tool head has a function of selectively pressing the embossing tool against the medium to be processed, and a function of moving the platen roller together with the embossing tool in the axial direction.

In this embossing apparatus, an embossed portion having a recess is formed on the medium to be processed by pressing the ball of the embossing tool is pressed against the medium to be processed. Embossing is performed by operating the platen roller and tool in a state in which the embossed portion is thus formed. The embossed portion extends in the longitudinal direction of the medium to be processed when the platen roller rotates. The embossed portion also extends in the widthwise direction of the medium to be processed when the tool head moves in the axial direction of the platen roller. That is, the embossing apparatus disclosed in the literature can perform embossing on an arbitrary shape because the platen roller and tool head cooperate with each other.

Unfortunately, the embossing apparatus disclosed in the literature has the problem that it is difficult to perform embossing by which the shape of an embossed portion is clear. This is so probably because the boundary between a non-embossed portion and embossed portion is not bent but pulled.

SUMMARY OF THE INVENTION

The present invention has been made to eliminate the problem as described above, and has as its object to provide a control method of an embossing apparatus capable of performing embossing by which the shape of an embossed portion is clear.

To achieve this object, the control method of the embossing apparatus of the present invention includes moving a cutting tool including a blade to a position facing a predetermined first target position of a medium to be processed, by controlling an operation of a first driving device configured to move, in a first direction, a support member on which the medium to be processed is adhered, and an operation of a second driving device configured to move the cutting tool and an embossing tool which recesses the medium to be processed by pressing, in a second direction parallel to a major surface of the support member and different from the first direction, controlling an operation of a first pressing device configured to move the cutting tool in a third direction perpendicular to the major surface of the support member, thereby sticking the blade into the first target position of the medium to be processed, and stopping the blade in a state in which a blade edge is positioned between upper and lower surfaces of the medium to be processed, forming a cut line in the medium to be processed by moving the support member in the first direction by the first driving device, and moving the cutting tool in the second direction by the second driving device, in the state in which the blade is stuck in the medium to be processed, moving the cutting tool to a position where the blade is pulled out from the medium to be processed, by controlling the operation of the first pressing device, moving the embossing tool to a position facing a second target position along the cut line of the medium to be processed, by controlling the operations of the first driving device and the second driving device, controlling an operation of a second pressing device configured to move the embossing tool in the third direction, thereby pressing the embossing tool against the second target position, and forming a recess in the medium to be processed, and forming an embossed portion in the medium to be processed by a continuous recess extending along the cut line, by moving the support member in the first direction by the first driving device, and moving the embossing tool in the second direction by the second driving device, in the state in which the embossing tool is pressing the medium to be processed.

DESCRIPTION OF THE PREFERRED EMBODIMENT

An embossing apparatus control method as an embodiment of the present invention will be explained in detail below with reference to FIGS. 1 to 15. First, the arrangement of an embossing apparatus to be used to perform this control method will be explained with reference to FIGS. 1 to 11.

Figure 1:
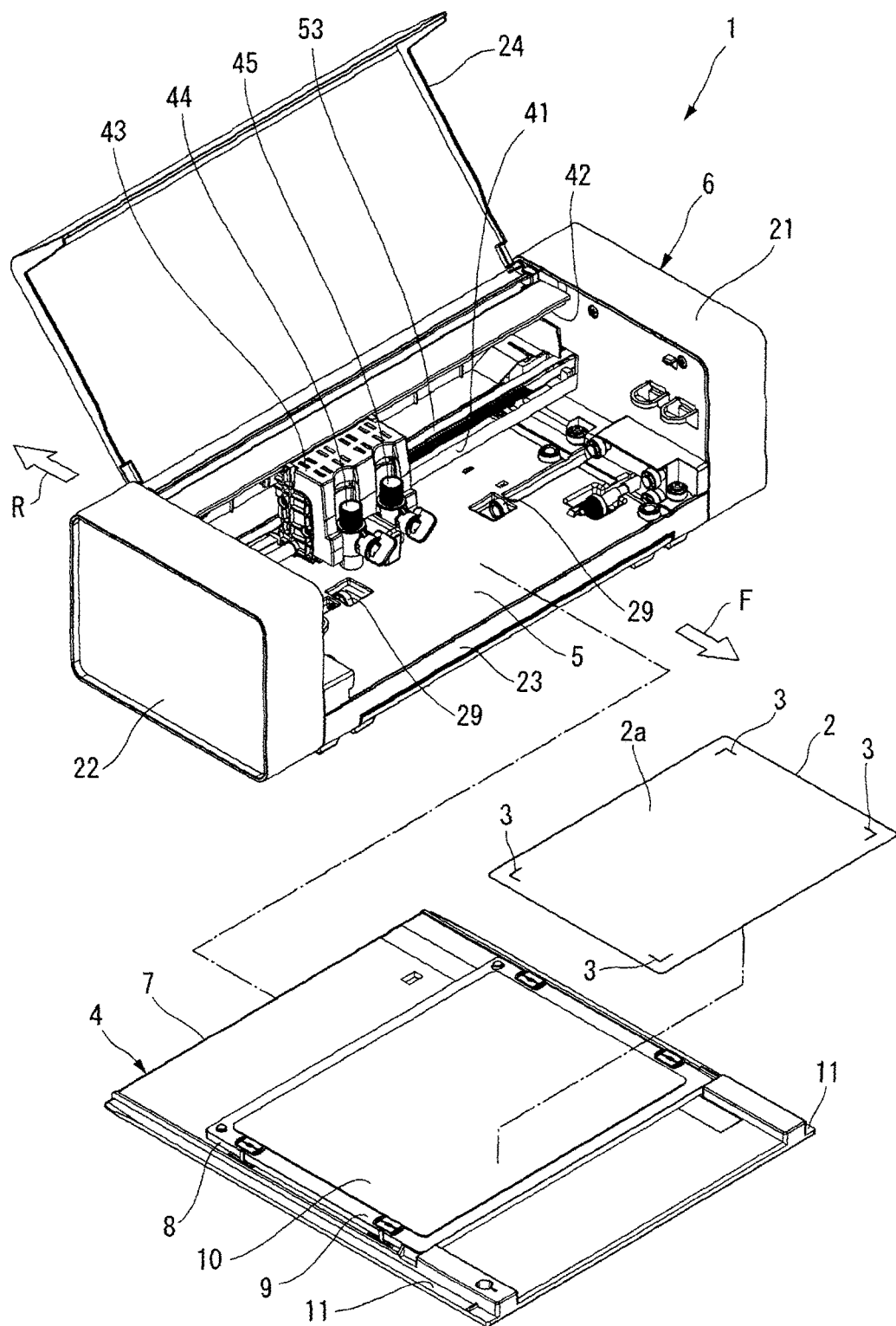
FIG. 1 is a perspective view of an embossing apparatus to be controlled by a control method as an embodiment of the present invention.

An embossing apparatus 1 shown in FIG. 1 is used to perform embossing on a sheet-like medium 2 to be processed. The sheet-like medium 2 to be processed is a sheet such as paper and, more specifically, a greeting card, message card, or postcard formed by paper. The medium 2 to be processed according to this embodiment has reference marks 3 indicating reference positions in order to specify processing positions when performing embossing. The reference marks 3 are preprinted in the reference positions of the medium 2 to be processed.

The embossing apparatus 1 includes a movable stage 4 for holding the media 2 to be processed as they are stacked, and an embossing apparatus main body 6 having a flat conveyance path 5 in which the movable stage 4 passes. The conveyance path 5 is formed in the bottom portion of the embossing apparatus main body 6 so as to extend in the back-and-forth direction. The back-and-forth direction herein mentioned is a direction parallel to a major surface 2a of the medium 2 to be processed, and pointing to a lower right position and an upper left position from the embossing apparatus main body 6 in FIG. 1. That is, the conveyance path 5 extends in the back-and-forth direction parallel to the major surface 2a of the medium 2 to be processed. In this embodiment, this back-and-forth direction is equivalent to "a first direction" of the present invention.

As will be described in detail later, the movable stage 4 moves in the back-and-forth direction as a direction in which the conveyance path 5 extends. In this embodiment, a direction pointing a lower right position from the embossing apparatus 1 in FIG. 1 (a direction which points the front of the embossing apparatus main body 6) is called "forward" and indicated by an arrow F in FIG. 1, for the sake of convenience. "Backward" is indicated by an arrow R in FIG. 1. Also, in the following description, a direction parallel to the major surface 2a of the medium 2 to be processed and perpendicular to the direction (back-and-forth direction) in which the conveyance path 5 extends will simply be called "a widthwise direction". In this embodiment, this widthwise direction is equivalent to "a second direction" of the present invention.

Figure 2:
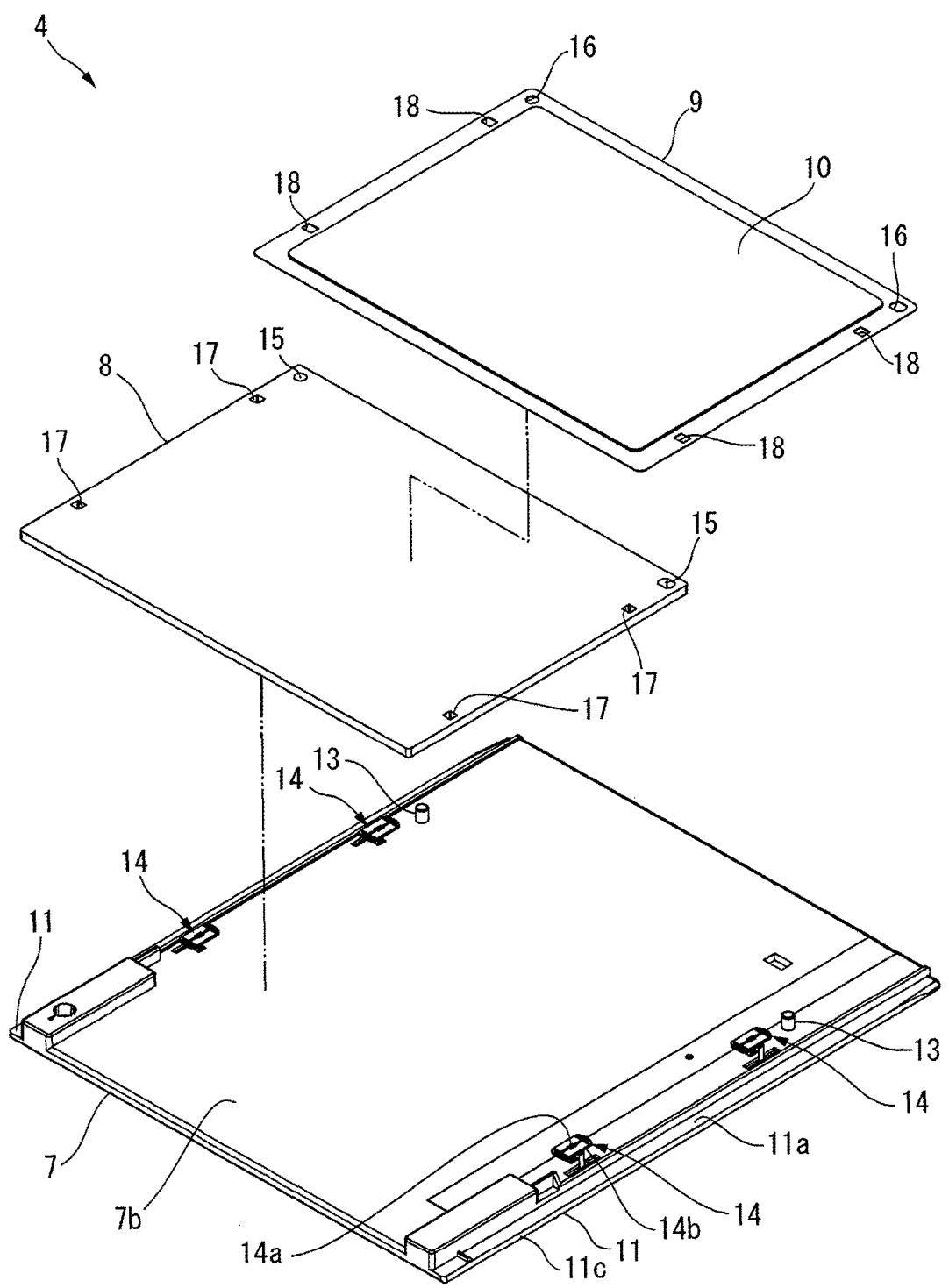
FIG. 2 is an exploded perspective view of a movable stage.

As shown in FIG. 2, the movable stage 4 is assembled by stacking a plurality of members in the vertical direction. The plurality of members are a work table 7 in the lowermost position in FIG. 2, and a plate-like spacer 8, base plate 9, and mat 10 arranged above the work table 7. The plate-like spacer 8, base plate 9, and mat 10 are stacked in this order. The work table 7 is formed into a plate shape by using a rigid material. In this embodiment, the work table 7 is equivalent to "a support member" of the present invention.

The plate-like spacer 8 is used to adjust the height of the mat 10. A plurality of different types of spacers different in thickness are prepared as the plate-like spacer 8, and a spacer having a thickness corresponding to the thickness of the medium 2 to be processed is used. In this embodiment, 3-mm, 2-mm, and 1-mm thick plate-like spacers 8 are prepared. As the material for forming the plate-like spacer 8, it is possible to use a rigid plastic material or a light-weight material such as so-called sponge. The base plate 9 is formed into a thin plate shape by using PET (polyethylene terephthalate).

Figure 3:
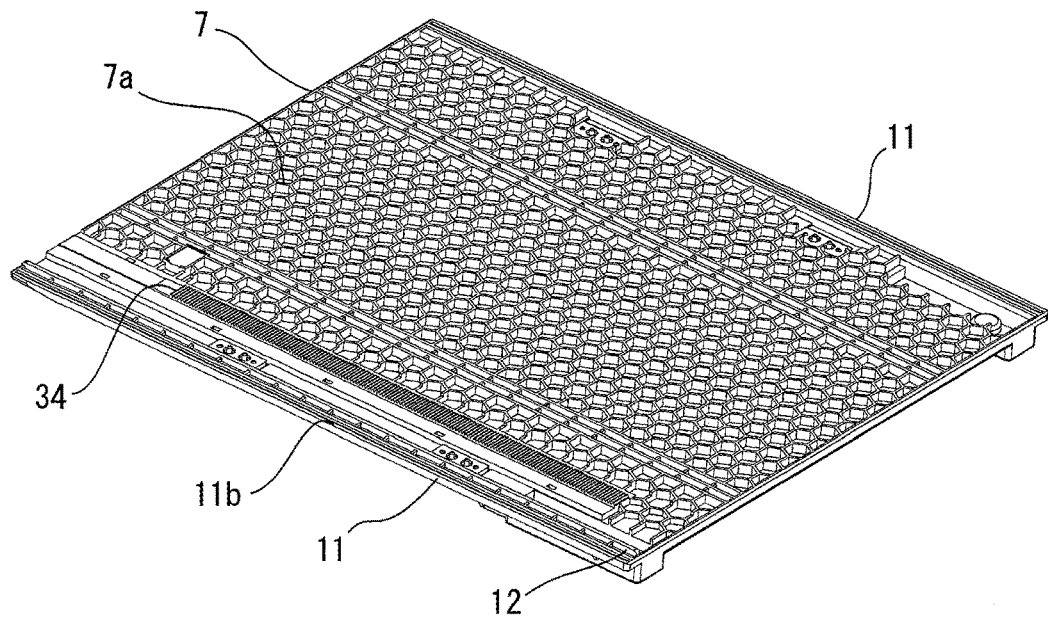
FIG. 3 is a perspective view showing he lower surface of a work table.

The work table 7 is formed by a rigid plastic material which hardly bends. A honeycomb reinforcing rib 7a (see FIG. 3) is formed on the lower surface of the work table 7 in order to minimize deformation. As shown in FIG. 2, a flat placement surface 7b overlapping the entire region of the lower surface of the plate-like spacer 8 is formed on the upper surface of the work table 7. The placement surface 7b is equivalent to "a major surface" of the work table 7 of the present invention. First guide rails 11 functioning as guides when the work table 7 moves along the conveyance path 5 (to be described later) are formed in the two ends of the work table 7 in the widthwise direction. As shown in FIG. 3, a second guide rail 12 is formed in one end portion of the lower surface of the work table 7 in the widthwise direction. The first and second guide rails 11 and 12 are formed into thin plate shapes extending in the back-and-forth direction from one end to the other of the work table 7.

The first guide rail 11 is formed into a plate shape which extends in the back-and-forth direction and projects outside the work table 7 in the widthwise direction. Of the first guide rail 11, an upper surface 11a and lower surface 11b (see FIG. 3) and an outer end face 11c in the widthwise direction are used as guide surfaces. The second guide rail 12 is formed in an end portion positioned on the right side when viewed from above with respect to the moving direction when the work table 7 moves backward. The second guide rail 12 is formed into a plate shape which extends in the back-and-forth direction and projects downward from the work table 7. Of the two side surfaces of the second guide rail 12 in the widthwise direction, one end face pointing the center of the work table 7 in the widthwise direction is used as a guide surface.

In the two end portions of the work table 7 in the widthwise direction, as shown in FIG. 2, two pins 13 for positioning the plate-like spacer 8 and base plate 9 and four clamping mechanisms 14 for fixing other members of the movable stage 4 on the work table 7 are formed.

The two pins 13 are formed on the upper surface of the work table 7 by monolithic molding, so as to have a shape which projects upward. The pins 13 fit in through holes 15 and 16 respectively formed in the plate-like spacer 8 and base plate 9.

The clamping mechanism 14 has a structure which holds another member by vertically clamping the member in cooperation with the work table 7. The clamping mechanism 14 includes an axial member 14a extending through other members of the movable stage 4, and a stopper plate 14b detachably locked by the axial member 14a. The axial member 14a is inserted into a through hole 17 of the plate-like spacer 8 and a through hole 18 of the base plate 9. The stopper plate 14b is locked from above by the axial member 14a projecting upward from the base plate 9 in the uppermost position. Although not shown, a large number of blades are vertically arranged on the axial member 14a. When pressed downward by a worker (not shown), the stopper plate 14b moves down over the tip of the blade, and is locked by the next blade. When this locked state is canceled and the stopper plate 14b is unlocked from the blade, the stopper plate 14b can be removed upward from the axial member 14a.

The mat 10 is formed into a plate shape having a predetermined thickness by using a flexible elastic material, and adhered on the base plate 9 by using, e.g., an acrylic adhesive. The material forming the mat 10 according to this embodiment is a soft foam. The medium 2 to be processed can easily be adhered on and separated from the surface of the mat 10. A surface like this can be implemented by using a soft foam having self-adsorption as the material of the mat 10, or coating the surface of foam having no self-adsorption with an adhesive material. The self-adsorption herein mentioned is a property which allows easy adhesion and separation without using any adhesive. The self-adsorption is implemented by micro suckers (not shown) obtained by a large number of fine recesses formed in the surface of the soft foam.

The mat 10 is adhered on the base plate 9 and fixed together with the plate-like spacer 8 on the work table 7 by the above-described clamping mechanisms 14. The medium 2 to be processed is adhered on the mat 10 from above. Note that when the adhesion of the surface of the mat 10 weakens, the mat 10 can be replaced with a new one together with the base plate 9, or can be separated from the base plate 9 and replaced with a new one.

As shown in FIG. 1, the embossing apparatus main body 6 includes a pair of sidewalls 21 and 22 positioned on the two sides of the conveyance path 5 in the widthwise direction, a bottom wall 23 connecting the sidewalls 21 and 22 below the conveyance path 5, and an opening/closing cover 24 for covering the conveyance path 5 from above.

In the boundary portions between the sidewalls 21 and 22 and bottom wall 23, which are also the two end portions of the conveyance path 5 in the widthwise direction, a plurality of rollers 25 to 28 (see FIG. 4) for regulating the movement of the work table 7 in the vertical direction and widthwise direction are formed.

Of these rollers, rollers for regulating the vertical movement of the work table 7 are upper rollers 25 and lower rollers 26 which rotate along the widthwise direction of the conveyance path 5 as an axial direction. The upper rollers 25 rotate in contact with the upper surface 11a (see FIG. 2) of the first guide rail 11 of the work table 7. The lower rollers 26 rotate in contact with the lower surface 11b (see FIG. 3) of the first guide rail 11. The upper rollers 25 are arranged in three portions of the conveyance path 5 in the back-and-forth direction. The lower rollers 26 are arranged below two upper rollers 25, of the upper rollers 25 in the three portions, which are positioned in the two end portions of the conveyance path 5 in the back-and-forth direction. The lower rollers 26 are arranged in positions where they clamp the first guide rail 11 in the vertical direction in cooperation with the upper rollers 25. Therefore, the work table 7 is held to be movable in the back-and-forth direction in the conveyance path 5 such that the vertical movement is regulated by the upper rollers 25 and lower rollers 26 in the two end portions in the back-and-forth direction and the two end portions in the widthwise direction.

Rollers for regulating the movement of the work table 7 in the widthwise direction are outer rollers 27 and inner rollers 28 which rotate in the vertical direction as an axial direction. The outer rollers 27 and inner rollers 28 are formed in only one end portion in the widthwise direction. This one end portion in the widthwise direction is an end portion positioned on the right side when the conveyance path 5 is viewed frontways. The outer rollers 27 rotate in contact with the end face 11c (see FIG. 2) of one first guide rail 11 of the work table 7. The one first guide rail 11 is the first guide rail 11 positioned on the right side when the work table 7 inserted into the conveyance path 5 is viewed frontways. The inner rollers 28 rotate in contact with the right-side end face of the second guide rail 12. This right-side end face is an end face positioned on the right side when the second guide rail 12 is viewed frontways. The outer rollers 27 and inner rollers 28 are formed in two portions of the conveyance path 5 in the back-and-forth direction.

The work table 7 is held by the rollers 25 to 28 when inserted frontways into the conveyance path 5. That is, the work table 7 is detachably attached to the conveyance path 5 so as to be movable in the back-and-forth direction (first direction) with the placement surface 7b (the major surface) being parallel to the conveyance path 5.

Figure 4:
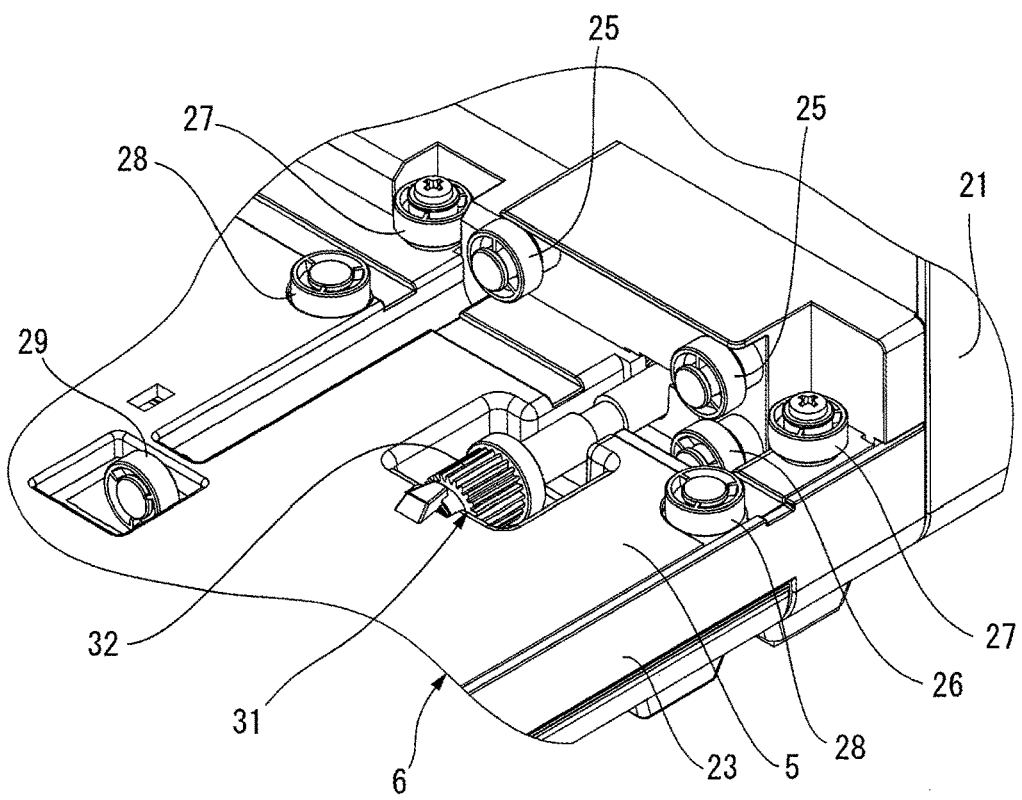
FIG. 4 is a perspective view showing a part of an embossing apparatus main body in an enlarged scale.

As shown in FIGS. 1 and 4, two center rollers 29 for supporting the central portion of the work table 7 are arranged on the bottom wall 23 of the embossing apparatus main body 6. The center rollers 29 are rotatably supported by the bottom wall 23 in the widthwise direction as an axial direction, and arranged at a predetermined interval in the widthwise direction. As shown in FIG. 4, a pinion 32 as a part of a conveyor device 31 (to be described later) is also arranged on the bottom wall 23. The conveyor device 31 moves the work table 7 in the direction (back-and-forth direction) in which the conveyance path 5 extends. In this embodiment, the conveyor device 31 forms "a first driving device" of the present invention.

Figure 5:
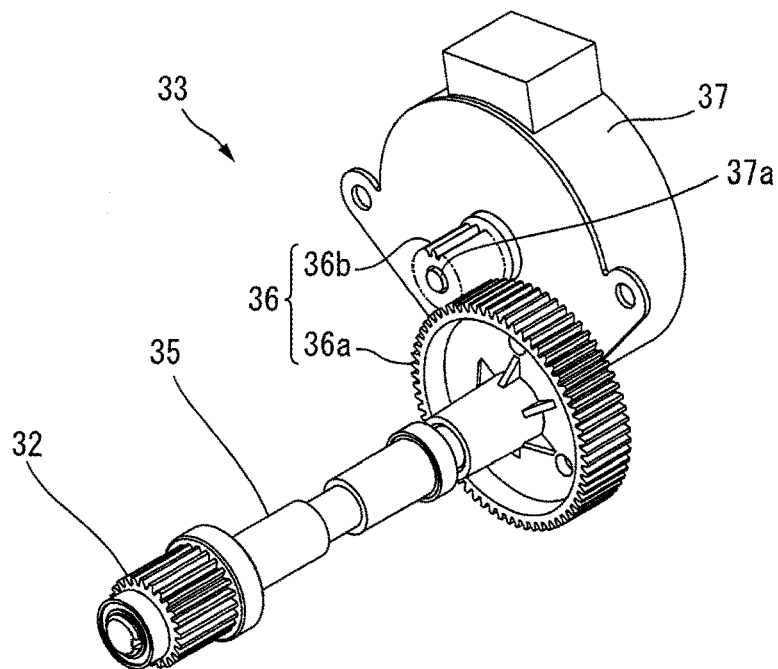
FIG. 5 is a perspective view showing a part of a conveyor device in an enlarged scale.

The conveyor device 31 includes a driving unit 33 (see FIG. 5) having the pinion 32, and a rack 34 (see FIG. 3) formed on the lower surface opposite to the placement surface 7b of the work table 7. The driving unit 33 is installed in the embossing apparatus main body 6. As shown in FIG. 5, the driving unit 33 includes the pinion 32 which meshes with the rack 34 described above, a rotating shaft 35 having one end portion on which the pinion 32 is formed, and a first motor 37 connected to the other end portion of the rotating shaft 35 via a speed reducing mechanism 36.

The speed reducing mechanism 36 includes a large-diameter gear 36a attached to the other end portion of the rotating shaft 35, and a small-diameter gear 36b attached to a rotating shaft 37a of the first motor 37. The driving unit 33 is arranged on one side of the conveyance path 5 in the widthwise direction. This one side is the right side when the conveyance path 5 is viewed frontways. The rotating shaft 35 is rotatably supported by the bottom wall 23 in the widthwise direction of the conveyance path 5 as an axial direction. A control device 39 (see FIG. 11) (to be described later) controls the operation of the first motor 37. When the rotating shaft 37a of the first motor 37 rotates, this rotation is transmitted to the pinion 32 via the speed reducing mechanism 36 and rotating shaft 35, and the pinion 32 rotates.

Figure 6:
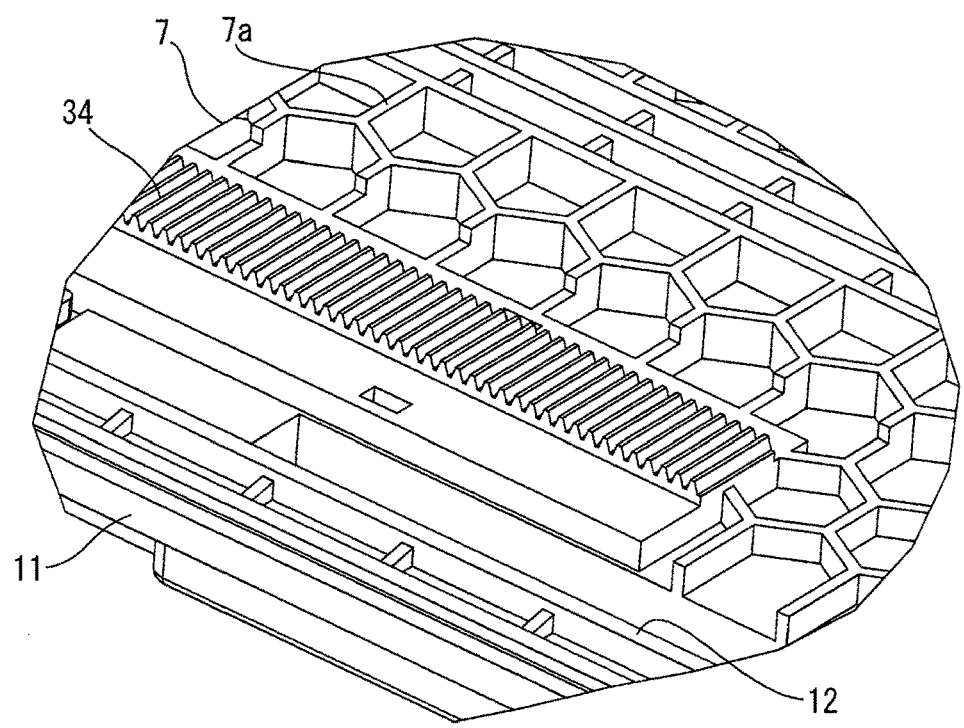
FIG. 6 is a perspective view showing a part of the lower surface of the work table in an enlarged scale.
Figure 7:
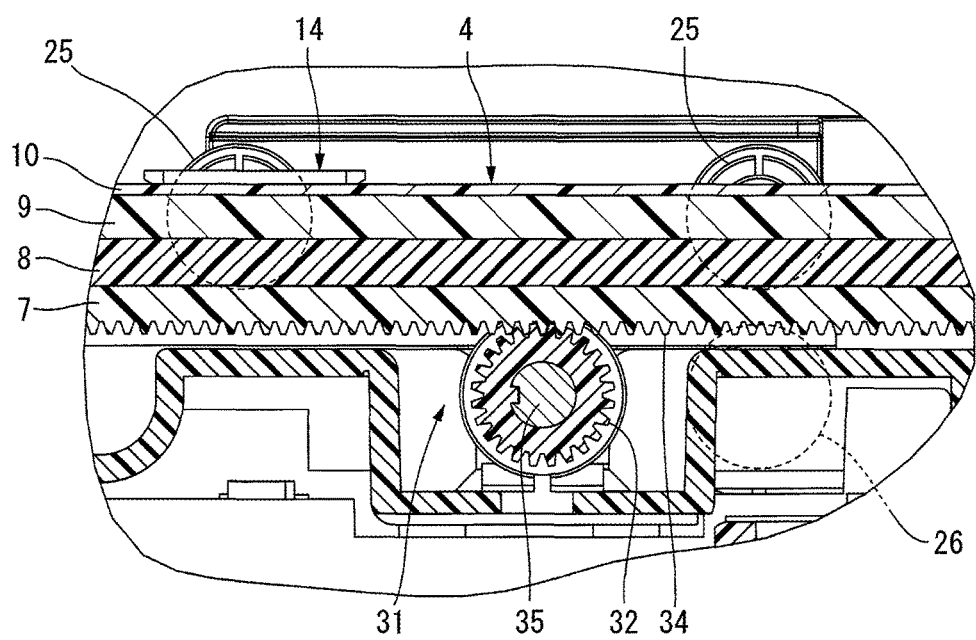
FIG. 7 is a sectional view showing a part of the embossing apparatus main body in an enlarged scale.

As shown in FIGS. 3 and 6, the rack 34 is formed parallel to the back-and-forth direction (the direction in which the conveyance path 5 extends) on that portion of the lower surface of the work table 7, which is close to the second guide rail 12. As shown in FIG. 7, the rack 34 meshes with the pinion 32 when the work table 7 is held by the plurality of rollers 25 to 28 described above. When the pinion 32 rotates forward or backward by being driven by the first motor 37, the movable stage 4 having the work table 7 moves forward or backward with respect to the embossing apparatus main body 6.

As shown in FIG. 1, the pair of sidewalls 21 and 22 of the embossing apparatus main body 6 support a lower guide rod 41 and upper guide rod 42 extending in the widthwise direction above the conveyance path 5. The lower and upper guide rods 41 and 42 are each formed by a pipe having a circular section, and are supported by the sidewalls 21 and 22 so as to be spaced apart from each other in the vertical direction. A pen carriage 43 (to be described later) is supported by the lower and upper guide rods 41 and 42 so as to be movable in the longitudinal direction of the rods 41 and 42. In other words, the pen carriage 43 is spaced apart from the bottom wall 23, and supported to be movable in the widthwise direction (a second direction) parallel to the placement surface 7b (the major surface) of the work table 7 attached to the conveyance path 5 and different from the back-and-forth direction (the first direction).

The pen carriage 43 movably supports a first pen tool 44 and second pen tool 45 in a third direction perpendicular to the placement surface 7b of the work table 7. In this embodiment, the third direction is the vertical direction.

The first pen tool 44 is a so-called cutting pen. In this embodiment, the first pen tool 44 is equivalent to "a cutting tool" of the present invention. As shown in FIG. 9, the first pen tool 44 includes a shaft 44a, and a blade 44b projecting from the lower end of the shaft 44a. The shaft 44a is detachably attached to a pen holder 46 (see FIG. 8) of the pen carriage 43. The pen holder 46 has a lever 47 for switching a state in which the shaft 44a is fixed, and a state in which the shaft 44a is unfixed.

The blade 44b can cut the medium 2 to be processed. The blade 44b projects downward from the lower end of the shaft 44a by a predetermined projection length. A worker (not shown) can change the projection length of the blade 44b projecting from the shaft 44a by rotating a screw cover 44c formed in the lower end portion of the shaft 44 with respect to the shaft 44a. When the projection length of the blade 44b is larger than the thickness of the medium 2 to be processed, the medium 2 to be processed can be cut by the first pen tool 44. When the projection length of the blade 44b is smaller than the thickness of the medium 2 to be processed, so-called half-cut can be performed on the medium 2 to be processed.

Figure 10A:
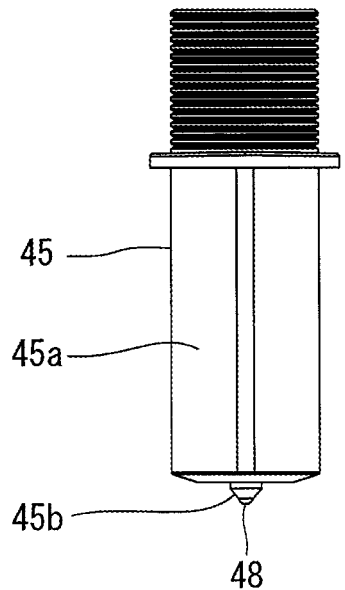
FIG. 10A is a side view of a second pen tool.
Figure 10B:
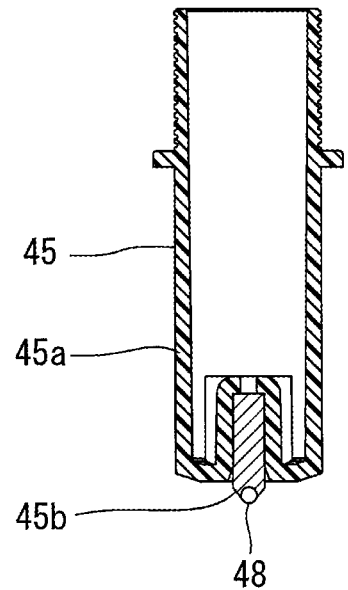
FIG. 10B is a longitudinal sectional view of the second pen tool.

The second pen tool 45 is used to perform embossing. The second pen tool 45 is equivalent to "an embossing tool" of the present invention. As shown in FIGS. 10A and 10B, the second pen tool 45 includes a shaft 45a, and a tool main body 45b formed in the lower end portion of the shaft 45a. Like the shaft 44a of the first pen tool 44, the shaft 45a is detachably attached to the pen holder 46 (see FIG. 8) of the pen carriage 43. A ball 48 is rotatably attached to the distal end portion (lower end portion) of the tool main body 45b.

The pen carriage 43 includes a first solenoid 51 (see FIG. 10) for vertically moving the first pen tool 44 (i.e., moving the first pen tool 44 in the third direction perpendicular to the placement surface 7b of the work table 7), and a second solenoid 52 for vertically moving the second pen tool 45 (i.e., moving the second pen tool 45 in the third direction). In this embodiment, the first solenoid 51 is equivalent to "a first pressing device" of the present invention, and the second solenoid 52 is equivalent to "a second pressing device" of the present invention. The control device 39 (to be described later) controls the operations of the first and second solenoids 51 and 52.

When driven by the first solenoid 51, the first pen tool 44 is pressed against the medium 2 to be processed. That is, the first solenoid 51 selectively presses the first pen tool 44 against the medium 2 to be processed. When the first pen tool 44 is pressed against the medium 2 to be processed, the blade 44b sticks into the medium 2 to be processed. When driven by the solenoid 52, the second pen tool 45 is pressed against the medium 2 to be processed. That is, the second solenoid 52 selectively presses the second pen tool 45 against the medium 2 to be processed.

Figure 8:
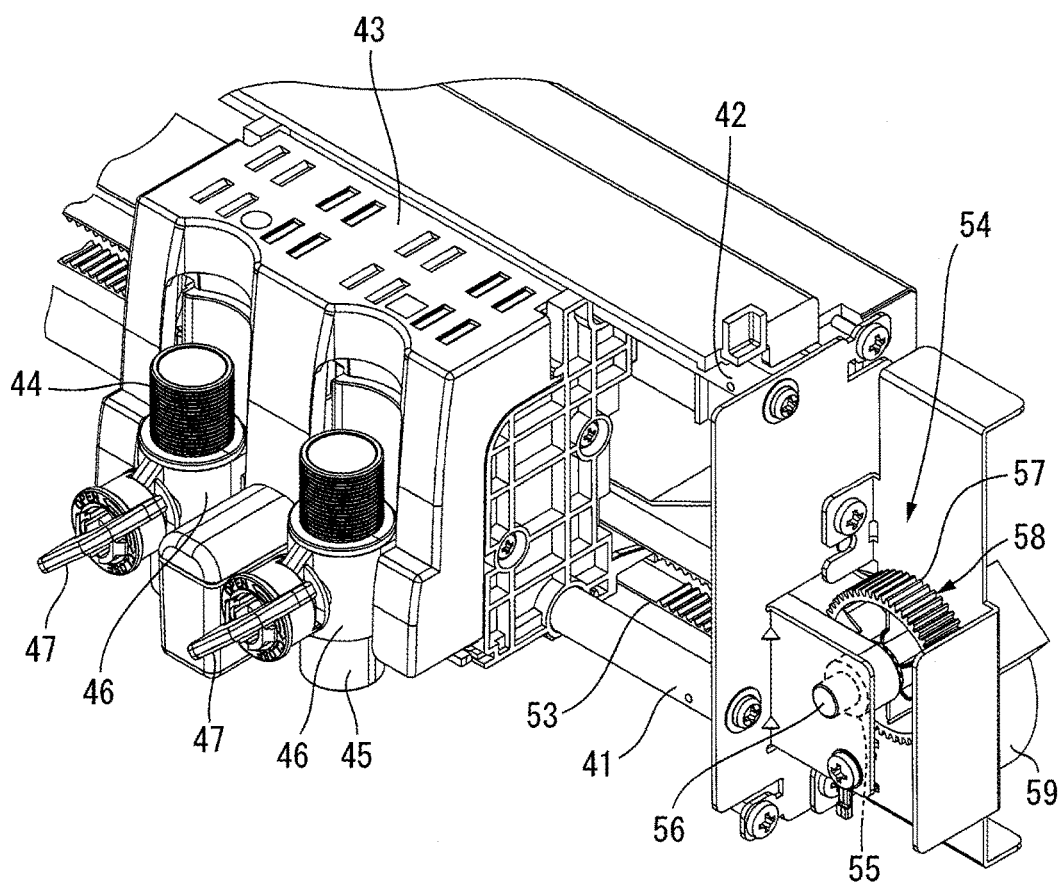
FIG. 8 is a perspective view showing a part of the embossing apparatus main body in an enlarged scale.
Figure 9:
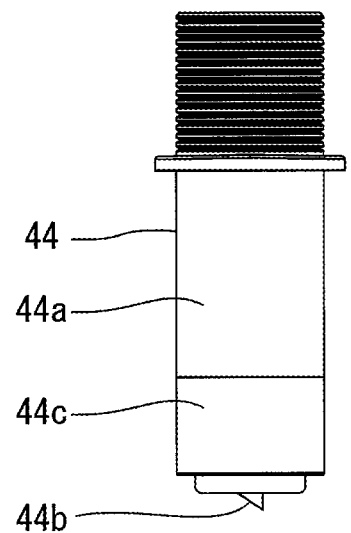
FIG. 9 is a side view of a first pen tool.

As shown in FIG. 8, a timing belt 53 extending in the horizontal direction is attached to the rear end portion of the pen carriage 43. The timing belt 53 forms a part of a widthwise-direction driving device 54 for moving the pen carriage 43 in the widthwise direction (second direction). The timing belt 53 is formed into an endless belt shape, wound around a driving pulley 55 (see FIG. 8) in the sidewall 21, and wound around a driven pulley (not shown) in the sidewall 22.

The widthwise-direction driving device 54 includes the timing belt 53, a rotating shaft 56 having the driving pulley 55 in one end portion, and a second motor 59 connected to the other end portion of the rotating shaft 56 via a speed reducing mechanism 58 including a large-diameter gear 57 and a small-diameter gear (not shown). The control device 39 (to be described later) controls the operation of the second motor 59. The pen carriage 43 moves in the widthwise direction when the driving pulley 55 rotates by being driven by the second motor 59, and this rotation is transmitted to the timing belt 53. In this embodiment, the widthwise-direction driving device 54 forms "a second driving device" of the present invention.

A photosensor 61 (see FIG. 11) is installed in the front end portion of the pen carriage 43. The photosensor 61 senses the reference mark 3 formed on the medium to be processed, and sends the sensed data as a signal to the control device 39.

Figure 11:
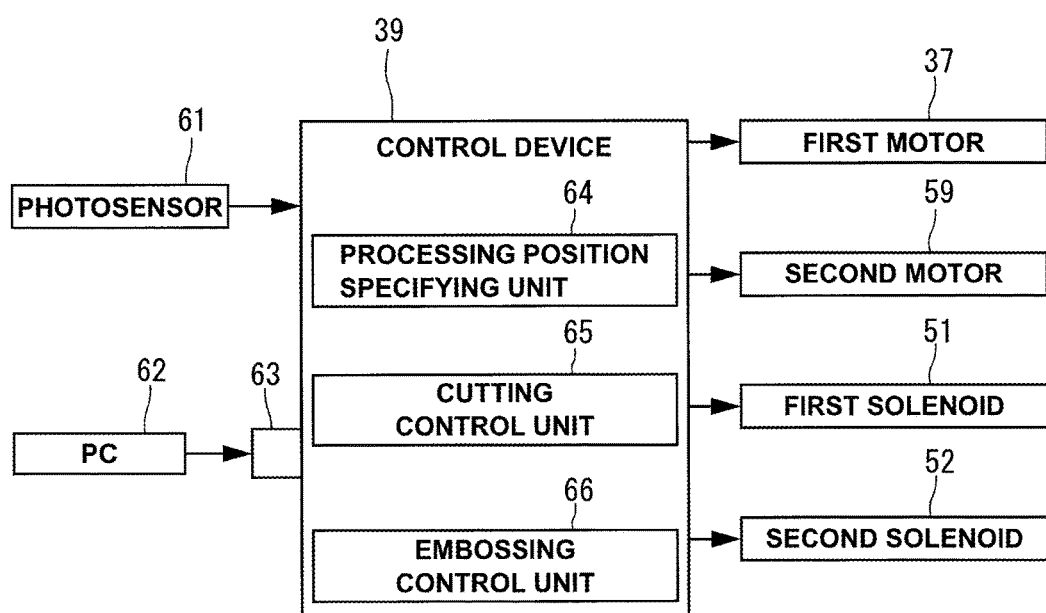
FIG. 11 is a block diagram of a control system.

The control device 39 is formed by using, e.g., a microprocessor, and implements a plurality of functional units (to be described later). As shown in FIG. 11, the first and second motors 37 and 59, first and second solenoids 51 and 52, photosensor 61, and the like are connected to the control device 39. The control device 39 also includes an interface 63 to which a personal computer (PC) 62 is connected, in order to receive data necessary for processing.

The plurality of functional units implemented by the control device 39 are a processing position specifying unit 64, cutting control unit 65, and embossing control unit 66. The processing position specifying unit 64 has a function of specifying the position of the medium 2 to be processed with respect to the work table 7 based on the sensing result from the photosensor 61. When obtaining the position of the medium 2 to be processed, the processing position specifying unit 64 operates the conveyor device 31 (the first motor 37) and the widthwise-direction driving device 54 (the second motor 59) based on a predetermined sensing program. When this sensing program is executed, the photosensor 61 moves in the back-and-forth direction and widthwise direction with respect to the medium 2 to be processed, and senses the reference marks 3 on the medium 2 to be processed.

The cutting control unit 65 has the following two functions. The first function is a function of vertically moving the first pen tool 44 by controlling the operation of the first solenoid 51. The second function is a function of moving the first pen tool 44 in the back-and-forth direction and widthwise direction with respect to the medium 2 to be processed, by controlling the operations of the first motor 37 and second motor 59.

When the first pen tool 44 moves down in a state in which the projection length of the blade 44b of the first pent tool 44 is set to be smaller than the thickness of the medium 2 to be processed, the edge of the blade is positioned between the upper and lower surfaces of the medium 2 to be processed. When the first pen tool 44 moves in the back-and-forth direction and widthwise direction in this state, a cut line (half-cut line) is formed into a predetermined shape on the medium 2 to be processed, thereby performing half-cut. This half-cut is performed before embossing is performed.

When the first pen tool 44 moves down and moves in the back-and-forth direction and widthwise direction with respect to the medium 2 to be processed in a state in which the projection length of the blade 44b is larger than the thickness of the medium 2 to be processed, the medium 2 to be processed is cut into a predetermined shape. This cutting is performed when separating a product from the medium 2 to be processed after embossing is complete. These half-cut and cutting are performed based on control data supplied from the personal computer 62. As will be described in detail later, this control data contains data such as the positions of half-cut, cutting, and embossing, and the shape of a portion to be processed.

The embossing control unit 66 has the following two functions. The first function is a function of vertically moving the second pen tool 45 by controlling the operation of the second solenoid 52. The second function is a function of moving the second pen tool 45 in the back-and-forth direction and widthwise direction with respect to the medium 2 to be processed, by controlling the operations of the first motor 37 and second motor 59. When the second pen tool 45 moves down and the ball 48 is pressed against the medium 2 to be processed, the medium 2 to be processed is recessed while compressing the mat 10, and a recess is formed in the medium 2 to be processed.

When the second pen tool 45 thus pressed against the medium 2 to be processed moves in the back-and-forth direction and widthwise direction with respect to the medium 2 to be processed, an embossed portion as a continuous recess is formed in the medium 2 to be processed. That is, the control device 39 controls the operations of the conveyor device 31, widthwise-direction driving device 54, and second solenoid 52 (the first and second driving devices and the second pressing device), and embosses the medium 2 to be processed by the second pen tool 45 (the embossing tool).

Like half-cut, this embossing is performed based on control data supplied from the personal computer 62. A procedure of forming the above-described control data will be explained below with reference to a flowchart shown in FIG. 12 and schematic views shown in FIGS. 13A and 13B.

A worker forms the control data by using, e.g., dedicated application software operating on the personal computer 62. The worker performs this control data formation work while watching a monitor of the personal computer 62.

The control data contains contour data and offset data to be described below. The contour data is data of a shape as a target of half-cut. When half-cut is performed, a cut line having the same shape as that of the contour data is formed in the medium 2 to be processed. The offset data is data of a shape equivalent to a moving locus when the second pen tool 45 moves in order to perform embossing. When setting the contour data in this application software, it is possible to select a method of using preregistered figure data, or a method of forming new figure data.

Figure 12:
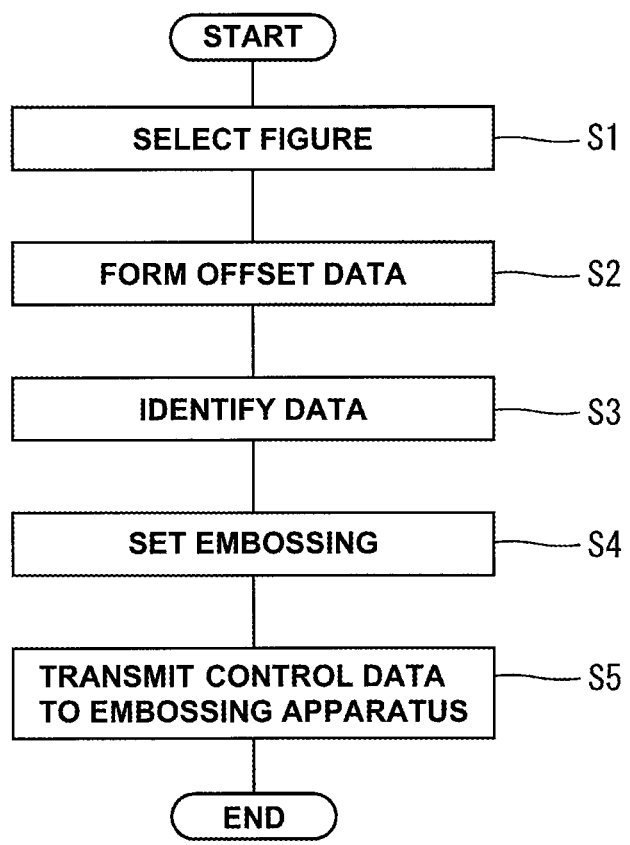
FIG. 12 is a flowchart showing a procedure of forming control data for performing half-cut and embossing.
Figure 13A:
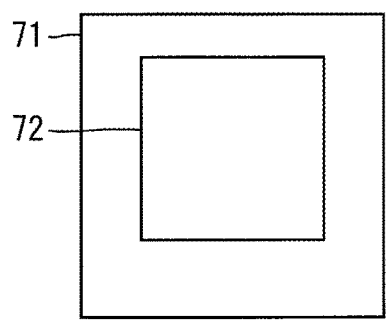
FIG. 13A is a schematic view showing an example of the contour shape of half-cut.

To form this control data, figure data as the contour data is selected or new figure data is formed in the above-described application software, in step S1 of the flowchart shown in FIG. 12. In the following description, a case in which a double square shown in FIG. 13A is selected will be explained. This figure shown in FIG. 13A includes a first square 71 positioned outside, and a second square 72 positioned inside the first square 71.

Then, the offset data is formed in step S2. The offset data is formed apart from the contour data by a dimension matching the outer diameter of the ball 48 formed in the second pen tool 45. Note that in this embodiment, the dimension matches the outer diameter of the ball 48 formed in the second pen tool 45. However, this dimension is appropriately settable, and can be a value set by the worker.

Figure 13B:
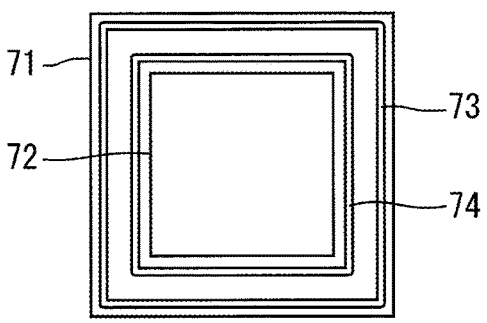
FIG. 13B is a schematic view showing an example of the shape of embossing.

When the contour data is the double square as shown in FIG. 13A, i.e., when a second closed line shape formed by the second square 72 exists inside a first closed line shape formed by the first square 71, offset data is formed between the first closed line shape positioned outside and the second closed line shape positioned inside. As shown in FIG. 13B, this offset data is shape data of a third square 73 positioned near the inside of the first square 71 and a fourth square 74 positioned near the outside of the second square 72. When the contour data is only the first square 71, in other words, when the shape of cut lines is a closed line shape and no other shape exists inside this line shape, offset data is formed inside the first square 71 (inside the closed line shape).

After the offset data is formed as described above, the contour data and offset data are made identifiable in step S3. This step is performed by giving different color information to line data contained in the contour data and offset data, or changing layers in which these line data are formed. The contour data and offset data are made identifiable as described above so that the control device 39 of the embossing apparatus 1 can distinguish between these data when using them.

Then, setting necessary to perform half-cut and embossing is performed in step S4. More specifically, the processing speed, pressure, and pen number when performing half-cut based on the contour data and the processing speed, pressure, and pen number when performing embossing based on the offset data are set. The processing speed is a moving velocity when the first or second pen tool 44 or 45 moves relative to the medium 2 to be processed. The pressure is a pressing force when pressing the first or second pen tool 44 or 45 against the medium 2 to be processed. This pressure can be adjusted by changing a voltage to be applied to the solenoid. The pen number is an individual number given to each of the first and second pen tools 44 and 45 in advance.

The control data is formed by performing steps S1 to S4. In step S5, this control data is transmitted to the control device 39 of the embossing apparatus 1 by the worker or application software. The control device 39 performs half-cut and embossing based on this control data.

Next, a control method of the embossing apparatus 1 according to an embodiment of the present invention will be explained in detail with reference to a flowchart shown in FIG. 14.

To emboss the medium 2 to be processed by the embossing apparatus 1, the worker first adheres the medium 2 to be processed on the mat 10 of the movable stage 4, and inserts the movable stage 4 into the conveyance path 5. In this state, the plurality of rollers 25 to 28 hold the work table 7, and the pinion 32 meshes with the rack 34. After that, the control device 39 starts control, and first specifies the position of the medium 2 to be processed by using the photosensor 61. In this state, the movable stage 4 moves in the back-and-forth direction by being driven by the conveyor device 31, and the pen carriage 43 moves in the widthwise direction by being driven by the widthwise-direction driving device 54.

Figure 14:
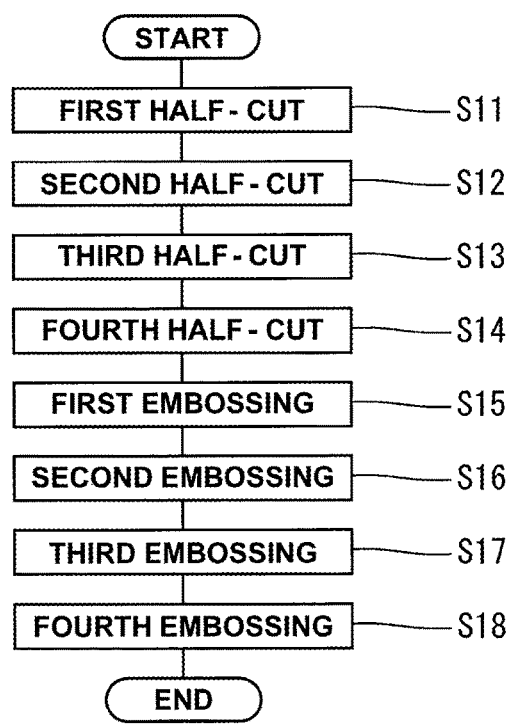
FIG. 14 is a flowchart for explaining the embossing apparatus control method as an embodiment of the present invention.

Then, the control device 39 executes first half-cut step S11 of the flowchart shown in FIG. 14. In first half-cut step S11, the control device 39 moves the first pen tool 44 to a position facing a predetermined first target position of the medium 2 to be processed by controlling the operations of the first motor 37 and second motor 59. The first target position is a position of the medium 2 to be processed, which corresponds to a predetermined processing start point of the contour data.

After the first pen tool 44 is positioned in the first target position, second half-cut step S12 is performed. In second half-cut step S12, the control device 39 controls the operation of the first solenoid 51, thereby moving (down) the first pen tool 44 closer to the medium 2 to be processed, sticking the blade 44$b$ into the first target position of the medium 2 to be processed, and stopping the first pen tool 44 in a state in which the blade edge is positioned between the upper and lower surfaces of the medium 2 to be processed.

After that, third half-cut step S13 is performed. In third half-cut step S13, the control device 39 moves the first pen tool 44 with respect to the medium 2 to be processed based on the above-described contour data in the state in which the blade 44$b$ is stuck in the medium 2 to be processed, thereby forming cut lines (half-cut lines) in the medium 2 to be processed. The first pen tool 44 is moved with respect to the medium 2 to be processed by moving the work table 7 in the back-and-forth direction by the conveyor device 31 (the first motor 37), and moving the first pen tool 44 in the widthwise direction by the widthwise-direction driving device 54 (the second motor 59). In this embodiment, the cut lines draw the same shapes as the first and second squares 71 and 72 shown in FIG. 13A.

After the cut lines are thus formed, the control device 39 performs fourth half-cut step S14. In fourth half-cut step S14, the control device 39 controls the operation of the first solenoid 51, thereby moving (up) the first pen tool 44 away from the medium 2 to be processed, and pulling out the blade 44$b$ from the medium 2 to be processed. That is, the first pen tool 44 is moved to a position where the blade 44$b$ is pulled out from the medium 2 to be processed.

Subsequently, the control device 39 performs first embossing step S15. In first embossing step S15, the control device 39 moves the second pen tool 45 to a position facing a predetermined second target position along the cut lines of the medium 2 to be processed by controlling the operations of the first motor 37 and second motor 59. The second target position is a position of the medium 2 to be processed, which corresponds to a predetermined processing start position of the offset data.

After that, the control device 39 performs second embossing step S16. In second embossing step S16, the control device 39 controls the operation of the second solenoid 52, thereby moving (down) the second pen tool 45 closer to the medium 2 to be processed, and pressing the second pen tool 45 against the second target position.

Figure 15:
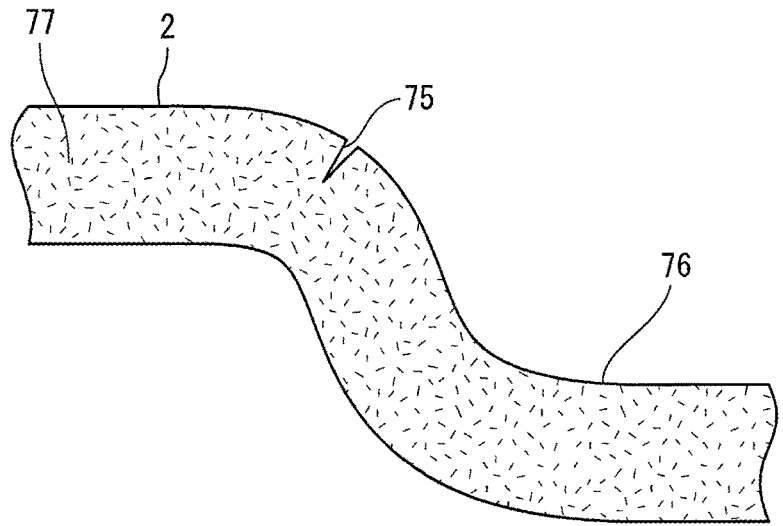
FIG. 15 is a sectional view showing a part of an embossed medium to be processed in an enlarged scale.

In the state in which the second pen tool 45 is pressing the medium 2 to be processed in second embossing step S16, the control device 39 performs third embossing step S17. In third embossing step S17, the control device 39 moves the second pen tool 45 in the back-and-forth direction and widthwise direction with respect to the medium 2 to be processed based on the offset data. This movement is performed by moving the work table 7 in the back-and-forth direction by controlling the operation of the first motor 37, and moving the second pen tool 45 in the widthwise direction by controlling the operation of the second motor 59. When the second pen tool 45 thus moves with respect to the medium 2 to be processed, an embossed portion is formed in the medium 2 to be processed by a continuous recess extending along the cut lines. This embossed portion is formed to have the same shapes as the third and fourth squares 73 and 74 shown in FIG. 13B. As shown in FIG. 15, a half-cut portion 75 makes the surface of the medium 2 to be processed easily bend, so a three-dimensional embossed portion (recessed portion) 76 having clear edges is formed in the medium 2 to be processed when embossing is performed in step S17.

After third embossing step S17 is complete, the process advances to fourth embossing step S18, and the control device 39 moves (up) the second pen tool 45 away from the medium 2 to be processed by the solenoid 52, thereby separating the second pen tool 45 from the medium 2 to be processed. Then, the control device 39 moves the pen carriage 43 to a predetermined initial position by controlling the operations of the first and second motors 37 and 59. Embossing is complete when the pen carriage 43 thus returns to the initial position. After that, an embossed product is obtained by separating the medium 2 to be processed from the mat 10 by the worker.

In this embossing apparatus control method, embossing is performed after half-cut is performed in the boundary between a non-processing portion 77 (see FIG. 15) which is not embossed and the embossing portion 76. When performing embossing, therefore, the boundary between the non-embossing portion 77 and embossing portion 76 breaks in the half-cut portion. Accordingly, it is possible to provide a control method of an embossing apparatus capable of performing embossing by which the shape of the embossing portion 76 is clear.

In this embodiment, the cut lines formed in third half-cut step S13 draw a closed line shape (the first square 71), and the embossing portion 76 having the same shape as the third square 73 is formed inside this closed line shape. Therefore, an embossing portion having a closed shape with a clear contour is formed.

In this embodiment, the cut lines draw the first closed line shape (the first square 71), and the second closed line shape (the second square 72) existing inside the first closed line shape. In addition, the embossing portion 76 having the same shapes as the third and fourth squares 73 and 74 is formed in the region between the first closed line shape positioned outside and the second closed line shape positioned inside. Since, therefore, the non-processing portion 77 positioned inside the second square 72 is surrounded by the embossing portion 76, a relief pattern can be formed on the medium 2 to be processed by embossing.

In the above-described embodiment, the example in which the non-embossing portion remains between the outside embossing portion 76 and inside embossing portion is disclosed. However, the present invention is not limited to this. The embossing portion can be formed on the entire region inside the closed line shape. A control data formation procedure in this case will be explained with reference to FIGS. 16 and 17A to 17J. A case in which a square shape shown in FIG. 17A is embossed will be explained below.

Figure 16:
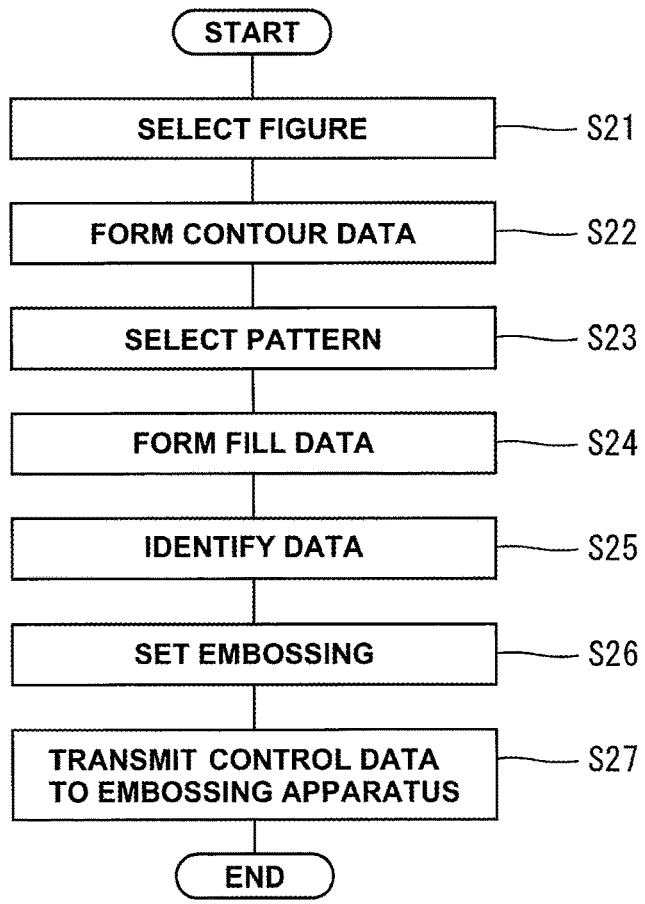
FIG. 16 is a flowchart showing a procedure of forming control data according to another embodiment of the present invention.
Figure 17A:
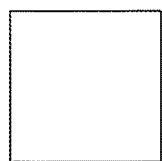
FIG. 17A is a plan view of a figure as a target of embossing.
Figure 17B:
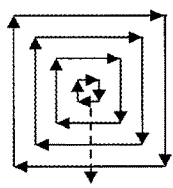
FIGS. 17B to 17J are schematic views showing fill patterns.
Figure 17C:
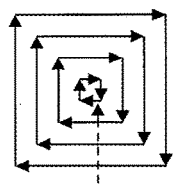
Figure 17D:
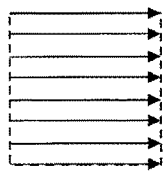
Figure 17E:
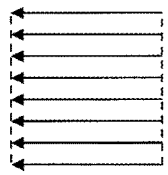
Figure 17F:
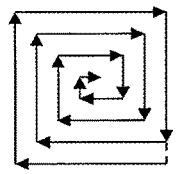
Figure 17G:
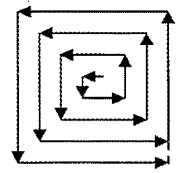
Figure 17H:
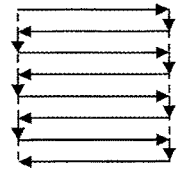
Figure 17I:
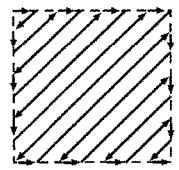
Figure 17J:
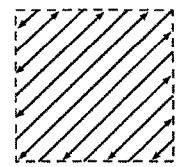

First, in step S21 of the flowchart shown in FIG. 16, square figure data shown in FIG. 17A is selected or this figure data is newly formed in the above-described application software. Then, in step S22, contour data for performing half-cut is formed based on the figure data shown in FIG. 17A.

After that, a moving pattern of the second pen tool 45 when performing embossing is set in step S23. Like an operation of filling a figure with an ink pen, embossing is performed by changing the position of the second pen tool 45 with respect to the medium 2 to be processed based on a predetermined moving pattern. As this moving pattern, nine moving patterns are registered as shown in, e.g., FIGS. 17B to 17J.

In step S23, one of the nine moving patterns shown in FIGS. 17B to 17J is selected. FIGS. 17B to 17J each illustrate the moving path of a pen when filling a figure with a line drawing. This line drawing shown in each of FIGS. 17B to 17J has a plurality of straight lines arranged in one or both of the back-and-forth direction and widthwise direction. The plurality of straight lines are spaced apart from each other by a predetermined pitch (this pitch will be referred to as a fill pitch hereinafter) in the back-and-forth direction or widthwise direction.

After the moving pattern is selected in step S23, fill data is formed in step S24. This fill data is formed by selecting a fill pitch suitable for the outer diameter of the ball 48, from a plurality of preregistered fill pitches.

After that, the contour data and fill data are made identifiable in step S25. This step is performed by giving different color information to line data contained in the contour data and fill data, or changing layers in which these line data are formed.

Then, setting necessary to perform half-cut and embossing is performed in step S26. More specifically, the processing speed, pressure, and pen number when half-cutting the contour and the processing speed, pressure, and pen number when embossing the fill portion are set.

The control data is formed by performing steps S21 to S25. In step S27, this control data is transmitted to the control device 39 of the embossing apparatus 1 by the worker or application software. The same effect as that of the above-described embodiment is obtained even when adopting the control method of performing embossing on the entire region of the interior of a closed shape as described above.

In the above-described embodiment, the example using the embossing apparatus 1 in which one pen carriage 43 includes the first and second pen tools 44 and 45 is disclosed. However, the present invention is not limited to this and can also be performed by using an embossing apparatus including only one pen tool. In this case, after the half-cut operation is performed by the first pen tool 44 (a cutting pen), the first pen tool 44 is replaced with the second pen tool 45 (an embossing tool), and embossing is performed using the second pen tool 45 after that.

In the above-described embodiment, the example in which embossing is performed in the state in which the medium 2 to be processed including the mat 9 is placed on the work table 7 is disclosed. However, the present invention is not limited to this, and embossing may also be performed in a state in which the medium to be processed is adhered on a pasteboard coated with a sticker.

What is claimed is:

1. A control method of an embossing apparatus, comprising:
moving a cutting tool including a blade to a position facing a predetermined first target position of a medium to be processed, by controlling an operation of a first driving device configured to move, in a first direction, a support member on which the medium to be processed is adhered, and an operation of a second driving device configured to move the cutting tool and an embossing tool which recesses the medium to be processed by pressing, in a second direction parallel to a major surface of the support member and different from the first direction;
controlling an operation of a first pressing device configured to move the cutting tool in a third direction perpendicular to the major surface of the support member, thereby sticking the blade into the first target position of the medium to be processed, and stopping the blade in a state in which a blade edge is positioned between upper and lower surfaces of the medium to be processed;
forming a cut line on a boundary between a non-processing portion where embossing is not performed and an embossing portion by moving the support member in the first direction by the first driving device, and moving the cutting tool in the second direction by the second driving device, in the state in which the blade is stuck in the medium to be processed;
moving the cutting tool to a position where the blade is pulled out from the medium to be processed, by controlling the operation of the first pressing device;
moving the embossing tool to a position facing a second target position along the cut line of the medium to be processed, by controlling the operations of the first driving device and the second driving device;
controlling an operation of a second pressing device configured to move the embossing tool in the third direction, thereby pressing the embossing tool against the second target position, and forming a recess in the medium to be processed; and
forming on the medium to be processed, after forming the cut line, an embossed portion formed of a continuous recess extending along the cut line and breaking the medium to be processed on the cut line, by moving the support member in the first direction by the first driving device, and moving the embossing tool in the second direction by the second driving device, in the state in which the embossing tool is pressing the medium to be processed.

2. The method of claim 1, wherein the forming the cut line includes drawing a closed line shape by the cut line, and the forming the embossed portion includes forming the embossed portion inside the closed line shape.

3. The method of claim 1, wherein the forming the cut line includes drawing, by the cut line, a first closed line shape, and a second closed line shape existing inside the first closed line shape, and the forming the embossed portion includes forming the embossed portion between the first closed line shape and the second closed line shape.

* * * * *